UNITED STATES PATENT OFFICE.

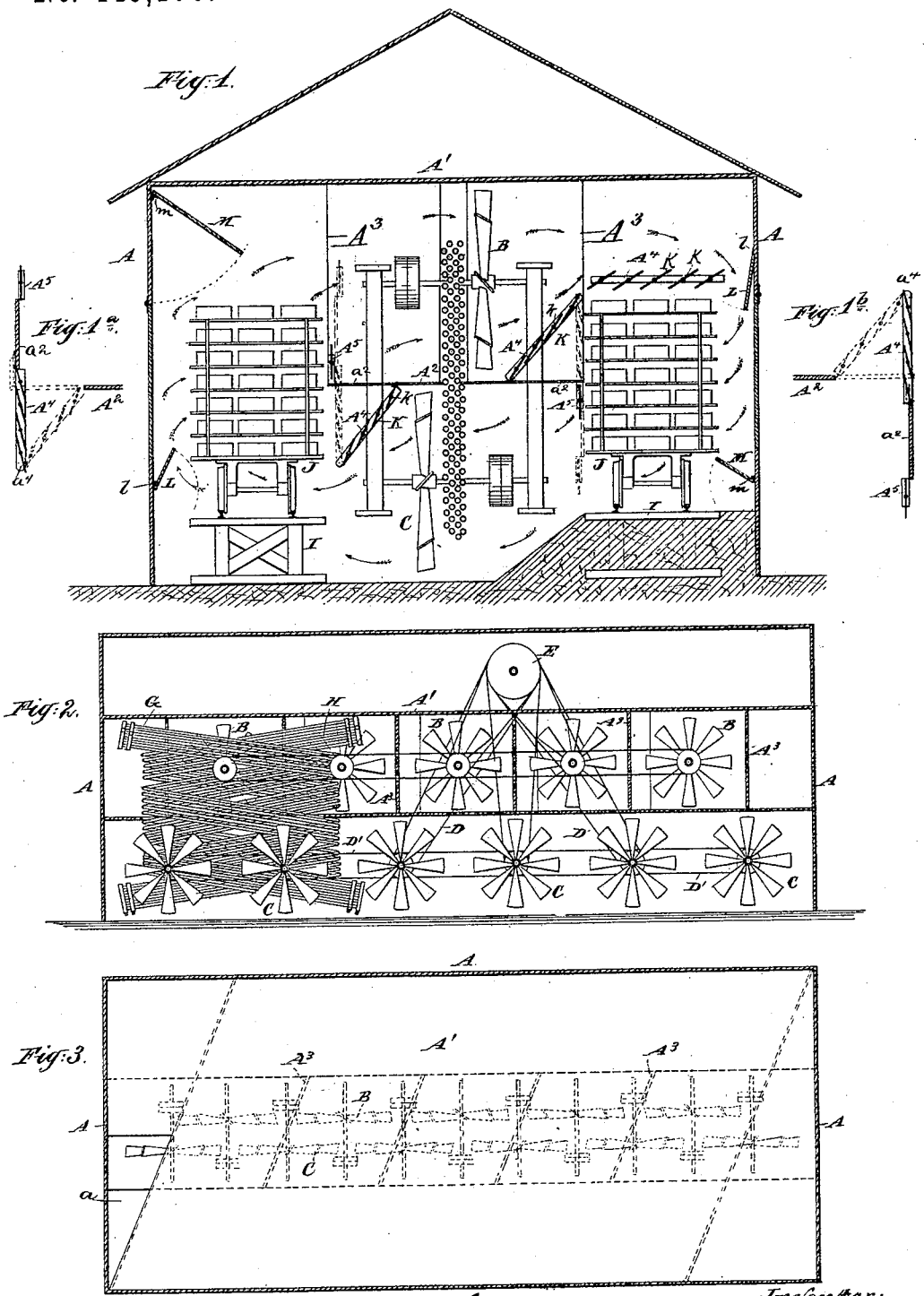

SIMEON G. PHILLIPS, OF WOODBRIDGE, NEW JERSEY.

DRYING APPARATUS.

SPECIFICATION forming part of Letters Patent No. 449,170, dated March 31, 1891.

Application filed April 14, 1890. Serial No. 347,816. (No model.)

*To all whom it may concern:*

Be it known that I, SIMEON G. PHILLIPS, of Woodbridge, in the county of Middlesex and State of New Jersey, have invented a certain new and useful Improvement in Drying Apparatus, of which the following is a specification.

The invention is intended more especially for drying articles of moderate size, as bricks, and will be described as thus used. It has long been common in the drying of bricks and analogous articles to place the properly-molded biscuit on sets of open-work shelves carried on wheels, technically cars, and to move these cars gradually through a building equipped with steam-heating pipes or other suitable provisions for warming air, and with fans or other suitable devices for circulating air. I use such devices. There are difficulties. If dry warm air is circulated so as to dry the exterior of any of the bricks too rapidly, cracks, technically checks, are developed which lower the value. It is important to take away the moisture from all the surfaces uniformly and as rapidly as can be done without "checking." I have devised an arrangement of apparatus which attains this end very perfectly.

The accompanying drawings form a part of this specification and represent what I consider the best means of carrying out the invention.

Figure 1 is a vertical cross-section through the building. Fig. 2 is a central longitudinal section on a smaller scale. Fig. 3 is a plan view, partly in horizontal section, on the same scale as Fig. 2. The dotted lines in Fig. 3 show the arrangement of the air-impelling fans and their driving-pulleys, and also the outlines of horizontal and vertical partitions which perform important functions. Figs. 1$^a$ and 1$^b$ are transverse sections of portions corresponding to Fig. 1, but showing them adjusted in different positions to facilitate the movements of the attendant in oiling and attending to the machinery.

Similar letters of reference indicate corresponding parts in all the figures where they occur.

A is the exterior of the building, and A′ is a floor or horizontal partition covering the whole area of the building at the level shown except a triangular aperture $a$. At about the mid-height between this flooring A′ and the ground is a horizontal partial partition A$^2$, which extends the whole length of the building, but only a portion of the breadth. This partial flooring divides the working-space in the building into two parts, one above the other.

I employ heating-pipes arranged in a narrow vertical series in the mid-breadth of the building, extending from one end about one-third the length of the building, as will be described more particularly farther on.

Referring to Figs. 2 and 3, the air is inducted at the right above the flooring A′ through an opening in the end, (not shown, but which may be of any convenient size and form,) and is conducted the whole length of the building, becoming partially warmed by the heat conducted upward thereto through such flooring. Descending through the aperture $a$, it is seized by one of the upper series of fan-wheels B and impelled transversely across to the right in Fig. 1. It descends after passing beyond the edge of the partition A$^2$, and returns under such partition, being impelled in the return direction by the series of fan-wheels C. It rises again after passing the opposite edge of the partition A$^2$, and again returns to the right; but this time it has advanced longitudinally of the building, so that it is acted on on its second passage not by the same wheel B, but by another wheel similarly lettered in the same series. This longitudinal traverse of the air is insured by a series of vertical partitions A$^3$, which extend across the building in oblique positions. (See Fig. 3.) At each passage of the air from the right side to the left the air is by the oblique partitions A$^3$ caused to move longitudinally of the building, so that on being returned by its traversing again to the left under the partial flooring A$^2$ and rising again it rises to effect its second traverse at a point so far advanced longitudinally of the building that it crosses the second time not in the same path as before, but between a different set of the oblique partitions A$^3$. Thus it traverses from side to side and obliquely longitudinally until it has traversed the whole of the building and is discharged through the partially-open end of the building at the right.

Each fan-wheel is provided with one or more pulleys. One such pulley on each shaft near the mid-length of the building receives a belt D, which is impelled by a pulley E, mounted above the flooring A', and revolved by a steam-engine or other suitable power. It will be understood that there are suitable belt-holes in the floorings A' A² and in the several oblique partitions A³ to accommodate the several belts. The fan-wheels near the ends of the building are driven by belts D', which are driven by the extra pulleys on the fan-shafts near the mid-length. All the fans may be of equal size and be driven at equal speeds; but it will be understood that the lower series C are left-handed or adapted to impel the air in the opposite direction to the impulsion received through the upper series of fan-wheels B.

The heating-pipes are greatly inclined. They are arranged in two series G and H. Each receives steam at the top through a suitable pipe from a steam-boiler. (Not represented.) Each distributes the steam thus received through a set of pipes arranged vertically one above another and extending longitudinally of the building. Each pipe is connected by a return-bend to a corresponding return-pipe, which extends at a corresponding inclination back to another return-bend nearly under the starting-point. The first set of pipes G is shown as thus extended forward three lengths and backward two lengths. The next set H is similar, but mounted in the reverse position. It extends backward three lengths and forward two lengths. The water with a small measure of steam is discharged from the bottom of each by a trap or other suitable means. (Not shown.) The arrangement of the heating-pipes insures efficient drainage, with a liberal presentation of heated pipes to the air as it is moved across the building from left to right and as it is returned from right to left. There may be a board or other suitable bar to prevent any considerable flow of air across through the space above the upper edge of the system of heating-pipes, and a similar provision to prevent the passage of air under the bottom of the set. These heating-pipes extend less than half the length of the building. They raise the temperature of the dry air which has been just received. The cars loaded with bricks are slowly moved either constantly or at intervals lengthwise of the building. They are always admitted at the end where the drying-air is discharged, the right hand in Figs. 2 and 3.

The air is discharged through the partially-open end of the building or through any suitable openings in one or both sides adjacent to the end. The bricks are moved from that end to the left, and before emerging from the building are subjected to the freshly-received cold air, imparting the most of their heat to the freshly-received air, thus aiding to warm it. The heat of the dry bricks about being discharged is thus transferred and utilized to aid in drying the bricks subsequently treated.

The cars J are run on tracks supported on trestles I. These supports are shown open-work on one side and closed with earth on the other. I prefer such arrangement, but it is not essential. The solid or earth support for the track on the side where the air descends, the right side in Fig. 1, compels the air to move actively through the mass of bricks on the car, and the open-work construction effected by a simple framing of timber, or it may be merely a series of piles on the side on which air ascends, the left side in Fig. 1, promotes the movement of air quite across, so as to act efficiently on the bricks on that side. The cars may be of the same character as are usually employed, except that the flooring or bottom of the body as well as the several shelves should be open to allow the free circulation of air upward and downward through all parts of the car.

K K are air-guides mounted on axes $k$ and capable of being turned as required. Each is entirely independent of the other and may be set independently to modify the flow of air through the loads of bricks on the several cars as they are successively presented. They may be in any length which shall be found convenient. I propose ordinarily that the several guides K K shall correspond each to one fan-wheel, the shafts being supported on sufficient frames A⁴, as shown. The series of guides K which are above the partial partition A² modify the motion of the air delivered by the series of fan-wheels B and compel a portion of the air to flow over the top and descend on the outer side of the car, so that the action of the apparatus shall be practically equal throughout the whole lot of bricks. The series of guides K which are below effect the distribution of the air from the fan-wheels C and compel a portion to traverse across under the car to which these pertain and come up in the space between such car and the wall, and thus equalize the action on all parts.

L L are screens adjustable by turning on hinges $l$ and held in position by friction or by any suitable confining means. (Not shown.) The screen L on the descending side, the right in Fig. 1, is near the top of the car. The corresponding screen on the ascending side, the left in Fig. 1, is near the bottom of the car. They serve to prevent the motion of the air up and down, respectively, from becoming excessive. M M are screens mounted at the bottom of the descending side and at the top of the ascending side to prevent the air thus moving from being thrown completely past the car and producing no effect. They turn on hinges $m$.

It is important for the attendant to be able to move about at will through the building to oil and otherwise attend to the several fan-wheels, and to examine and repair the parts when required. I provide for making liberal spaces inside of each line of cars through which a man may readily move.

Referring to Figs. 1, 1$^a$, and 1$^b$, the frames A$^4$ are hinged at their outer edges $a^4$ to fixed portions of the framing. Their inner edges are hinged to screens $a^2$, which screens, when the apparatus is in use, are adjusted horizontally in the plane of the partial partition A$^2$, and form in effect extensions thereof; but when it is desired to make a space for the attendant to move between the cars and machinery he can change the position of these parts A$^4$ $a^2$ into the vertical positions, shown in dotted lines in Fig. 1 and in strong lines in Fig. 1$^a$, the parts on the right-hand side hanging straight down from their hinge $a^4$ and the parts on the left-hand side standing straight up from their hinge $a^4$. There may be any convenient means (not shown) for holding these parts in those positions to allow the man to move conveniently along, and also to hold the parts in the bent positions (shown in the strong lines in Fig. 1) to adapt the apparatus for use.

To the outer edge of each screen $a^2$ is hinged a narrow screen A$^5$. When the apparatus is adjusted for work, these parts A$^5$ are set in the vertical position shown in strong lines in Fig. 1. When the parts are adjusted for allowing the attendant to move freely through the building, these narrow screens A$^5$ may continue to be in the vertical positions as indicated in dotted lines.

I may remark that in addition to the adjustments described the frames A$^4$, with the guides K supported in them, and the screens $a^2$ and the additional narrow screens A$^5$ may be adjusted in various positions intermediate between those shown in the strong lines and the dotted lines, when it shall be found, by experience or otherwise, that such intermediate position is conducive to uniformity of the drying at any point.

Modifications may be made without departing from the principle or sacrificing the advantages of the invention. Parts may be used without the whole. I can dispense with the provision for adjusting the screens L and M, taking care to find by practice what are the best proportions, or I can dispense with these screens altogether. I prefer the whole, as shown.

I claim as my invention—

1. In a drying apparatus, the partial flooring A$^2$, with spaces at the sides between its edges and the sides of the building, and means, as fan-wheels and vertical oblique partitions extending across the building, for inducing currents of air to move obliquely across the building above the flooring $a^2$, and in opposite directions below said flooring, and with two lines of cars J carrying articles to be dried and moved gradually in the direction opposite to the endwise movement of the air, and with the heating-pipes G H, all combined and arranged substantially as described, so that the air heated by its contact with the warm bricks being discharged is subsequently traversed obliquely across the building alternately in opposite directions in contact with the heating-pipes, and is presented to the material on the cars successively throughout the length of the building, substantially as herein specified.

2. In a drying apparatus, a floor A′, with provision for allowing the freshly-received air to traverse longitudinally over it, in combination with a partial flooring A$^2$, arranged at a lower level, with spaces at the sides between its edges and the sides of the building, and means, as the fan-wheels and vertical partitions extending across the building in oblique positions, for inducing currents of air to move obliquely across the building above the flooring A$^2$ and in opposite directions below said partitions, and with the two lines of cars J carrying articles to be dried and moved gradually in the direction opposite to the endwise movement of the air, and with the heating-pipes G H, all combined and arranged substantially as described, so that the air will be slightly heated above the flooring A′, further heated by its contact with the warm bricks being discharged, and subsequently traversed obliquely across the building alternately in opposite directions in contact with the heating-pipes, and presented to the material on the cars successively the length of the building, substantially as herein specified.

3. In a drying apparatus, the partial flooring or horizontal partition A$^2$ and air-impelled means B C, combined with the two lines of cars J upon opposite sides of the air-impelling means, and the adjustable air-guides K, mounted above and to the left of the cars on the right side and below and to the right of the cars on the left side, substantially as herein specified.

4. In a drying apparatus, the oblique vertical partitions A$^3$, in combination with a partial flooring or horizontal partition A$^2$, the air-impelling means B C, arranged to move the air across the building in one direction above and in the other below said partition, and with the two lines of cars J and air-heating means G H, all arranged for joint operation substantially as herein specified.

5. In a drying apparatus, the horizontal partial partition A$^2$, air-impelling means B C, and air-heating means G H, combined with the lines of cars J, arranged upon the right and left sides, and the adjustable screens M, mounted below and to the right of the car on the right-hand side and to the left and above the car on the left side, substantially as herein specified.

In testimony whereof I have hereunto set my hand, at New York city, New York, this 12th day of April, 1890, in presence of two subscribing witnesses.

SIMEON G. PHILLIPS.

Witnesses:
CHARLES R. SEARLE,
H. A. JOHNSTONE.